United States Patent [19]

Nazarian et al.

[11] 4,321,125
[45] Mar. 23, 1982

[54] APPARATUS FOR ELECTROCHEMICAL PURIFICATION OF CONTAMINATED LIQUIDS

[76] Inventors: Miron M. Nazarian, ulitsa Bljukhera, 13, kv. 138; Vyacheslav T. Efimov, ulitsa Sumskaya, 59, kv. 2; Alexandr A. Axenko, ulitsa Bairona, 152, kv. 25; Vladimir A. Kolyada, ulitsa Petrozavodskaya, 91a, kv. 30; Nikolai N. Zmievskoi, ulitsa Tonkopia, 11/1, kv. 84; Pavel P. Shaty, ulitsa Roberta Eidemana, 12, kv. 52, all of Kharkov, U.S.S.R.

[21] Appl. No.: 167,131

[22] Filed: Jul. 9, 1980

[51] Int. Cl.³ .............................................. C02C 5/12
[52] U.S. Cl. .................................. 204/273; 204/286; 204/288; 204/289; 204/149; 204/152
[58] Field of Search ............... 204/152, 149, 286, 288, 204/289, 273

[56] References Cited

U.S. PATENT DOCUMENTS

| 913,827 | 3/1909 | Korten | 204/152 X |
| 1,219,333 | 3/1917 | Kynaston | 204/152 |
| 4,036,726 | 7/1977 | Gale et al. | 204/152 X |
| 4,160,711 | 7/1979 | Nishizawa et al. | 204/152 |

*Primary Examiner*—Arthur C. Prescott
*Attorney, Agent, or Firm*—Robert E. Burns; Emmanuel J. Lobato; Bruce L. Adams

[57] ABSTRACT

The apparatus for electrochemical purification of contaminated liquids comprises a settling chamber with an outlet pipe to discharge purified liquid, which communicates with an electrocoagulation chamber having in its bottom portion a system of soluble electrodes and provided with an inlet pipe to feed contaminated liquid, disposed above said system of soluble electrodes, and with an inlet pipe to feed electrolyte, disposed below said system of electrodes. The bottom portion of the electrocoagulation chamber is also provided with partitions made of an insulating material and intended to reduce the intensity of mixing of liquid currents flowing up the electrocoagulation chamber.

3 Claims, 4 Drawing Figures

APPARATUS FOR ELECTROCHEMICAL PURIFICATION OF CONTAMINATED LIQUIDS

BACKGROUND OF THE INVENTION

1. Field of the Invention

The present invention relates to apparatus for purifying contaminated liquids and more particularly to an apparatus for electrochemical purification of contaminated liquids.

The invention may be employed for purifying liquids contaminated with organic substances, mechanical suspensions, surfactants, and the like.

The invention is particularly useful for purifying liquids contaminated with polymers and petroleum products, such as waste waters containing oils and greases.

2. Description of the Prior Art

Of all the known devices for purifying contaminated liquids, the widest and ever increasing application has recently been found by apparatus for electrochemical purification of liquids, in particular those where liquid is purified by the electroflotation and electrocoagulation methods, which is due to their high performance capabilities.

Apparatus are known where the electrochemical liquid purification process is accomplished either in batches, or continuously; the latter appears to be more promising.

A prior art apparatus for electrochemical purification of contaminated liquids (USSR Inventor's Certificate No. 407,844) comprises a settling chamber communicating with an electrocoagulation chamber installed therewithin. The electrocoagulation chamber has soluble electrodes and an inlet pipe to feed contaminated liquid, disposed below the electrodes; the settling chamber has an outlet pipe to discharge purified liquid. In the course of purification, the contaminated liquid with electrolyzing additives (HCl, NaCl) passes through the soluble electrodes whereto electric current is applied. This brings about the formation of hydroxides of the soluble electrode metal, which coagulate impurities contained in the liquid being purified. From the electrocoagulation chamber, the liquid passes into the settling chamber where foam and sludge separate from the liquid, whereupon the foam, the sludge, and the liquid are discharged separately.

Passing between the electrodes, the liquid being purified fouls these, which accelerates passivation of the electrodes and, hence, increases the power consumption, impairs the purification quality, and necessitates frequent cleaning of the electrodes, i.e. eventually reduces the efficiency of the apparatus.

In another prior art apparatus (Japanese Pat. No. 52-14397, published Nov. 3, 1977), the electrocoagulation chamber serves only to produce coagulants, for which purpose pure electrolyte is fed thereinto, while liquid purification is accomplished in another chamber whereinto the liquid being treated is fed and where the liquid is mixed with the electrolyte containing coagulants and fed from the electrocoagulation chamber.

While greatly diminishing the fouling of the electrode surfaces, such a construction of the apparatus considerably less utilizes the coagulating and flotation capabilities of the electrodes, since in the course of the electrolyte flow from the electrocoagulation chamber to the settling chamber the coagulants (hydroxides of the soluble electrode metal) and gas bubbles originating on the soluble electrode surface aggregate, which reduces their specific surface and, hence, impairs the coagulating and flotation capabilities, and ultimately results in a wasteful expenditure of electric power. Furthermore, an additional electric power is spent for mixing the contaminated liquid with the electrolyte.

Known in the art are apparatus which do not require additional power consumption for the mixing, wherein the contaminated liquid is mixed with the electrolyte in one electrocoagulation chamber, the contaminated liquid being fed into the chamber through an inlet pipe disposed above the electrodes, and the electrolyte being passed between the electrodes.

The liquid purification in such apparatus involves no fouling of the electrodes and proceeds at a higher degree of utilization of the coagulants and gas bubbles and consequently at a higher rate than in the previously described apparatus. For example, an apparatus for electrochemical purification of contaminated liquids, disclosed in USSR Inventor's Certificate No. 644,738, comprises a settling chamber with an outlet pipe to discharge purified liquid, which communicates with a tubular electrocoagulation chamber installed therewithin and having a system of soluble electrodes disposed in its bottom portion and an inlet pipe to feed contaminated liquid, disposed above said system of soluble electrodes. In accordance with the invention under consideration, the inlet pipe to feed contaminated liquid should be spaced from the electrodes at such a distance which excludes the possibility of fouling the latter by impurities contained in the contaminated liquid; for example, with a cylindrical inlet pipe, the distance is of (1 to 7)d, where d is the inlet pipe diameter.

The chief disadvantage of the above-described apparatus lies in that turbulization of electrolyte currents causes coagulants and gas bubbles in the electrocoagulation chamber space between the inlet pipe to feed contaminated liquid and the electrodes as well as in the interelectrode space to aggregate; hence, in this apparatus, as in the previously described one, a considerable amount of electric power is wasted due to incomplete utilization of the coagulants and gas bubbles.

SUMMARY OF THE INVENTION

The principal object of the present invention is to reduce the electric power consumption in an apparatus for electrochemical purification of contaminated liquids.

An important object of the invention is to raise the efficiency of an apparatus for electrochemical purification of contaminated liquids without increasing the size thereof.

An object of the invention is also to increase the degree of utilization of hydroxides of the soluble electrode metal in an apparatus for electrochemical purification of contaminated liquids.

Still another object of the invention is to reduce the consumption of electrodes in purifying contaminated liquids.

The above-mentioned and other objects of the invention are attained by that in an apparatus for electrochemical purification of contaminated liquids, comprising a settling chamber within an outlet pipe to discharge purified liquid, which settling chamber communicates with an electrocoagulation chamber installed therewithin and having a system of soluble electrodes, disposed in its bottom portion, an inlet pipe to feed contaminated liquid, disposed above said system of soluble electrodes, and an inlet pipe to feed electrolyte, disposed below said system of electrodes, according to the invention, the bottom portion of the electrocoagulation chamber is provided with partitions made of an insulating material and intended to reduce the intensity of mixing of liquid currents flowing up the electrocoagulation chamber.

Reducing the intensity of mixing of the liquid currents flowing up the electrocoagulation chamber retards the development of aggregates of the soluble electrode metal hydroxides (coagulants) and of the gas bubbles originating on the surface of the soluble electrodes, which raises the efficiency of an apparatus for electrochemical purification of contaminated liquids.

Retarding the development of aggregates of the coagulants and gas bubbles in the above-electrode space is attained by the provision of partitions of an insulating material between the electrodes and the inlet pipe to feed contaminated liquid. The partitions are preferably installed so that they define slit-shaped passages which form a continuation of the interelectrode gaps. Such partitions may be installed above either plate or cylindrical electrodes and are most simply secured to the top edges of the electrodes.

Retarding the development of aggregates of the coagulants and gas bubbles in the interelectrode space is attained by the provision in an apparatus for electrochemical purification of contaminated liquids of additional partitions installed in the interelectrode gaps and dividing the gaps into a plurality of vertical passages. When the electrodes have the form of plates, the additional partitions are preferably disposed perpendicular to the working faces of the electrodes, and when of cylinders, perpendicular to the normal to their working surfaces. Such an arrangement of the additional partitions imparts a higher stiffness to the system of soluble electrodes.

An apparatus for electrochemical purification of contaminated liquids is most preferably constructed so that the partitions of an insulating material are installed in its electrocoagulation chamber both above and between the soluble electrodes.

BRIEF DESCRIPTION OF THE DRAWINGS

The exact nature of the invention will now be explained by a detailed description of embodiments thereof with reference to the accompanying drawings, in which.

DETAILED DESCRIPTION OF THE INVENTION

Figure 1:
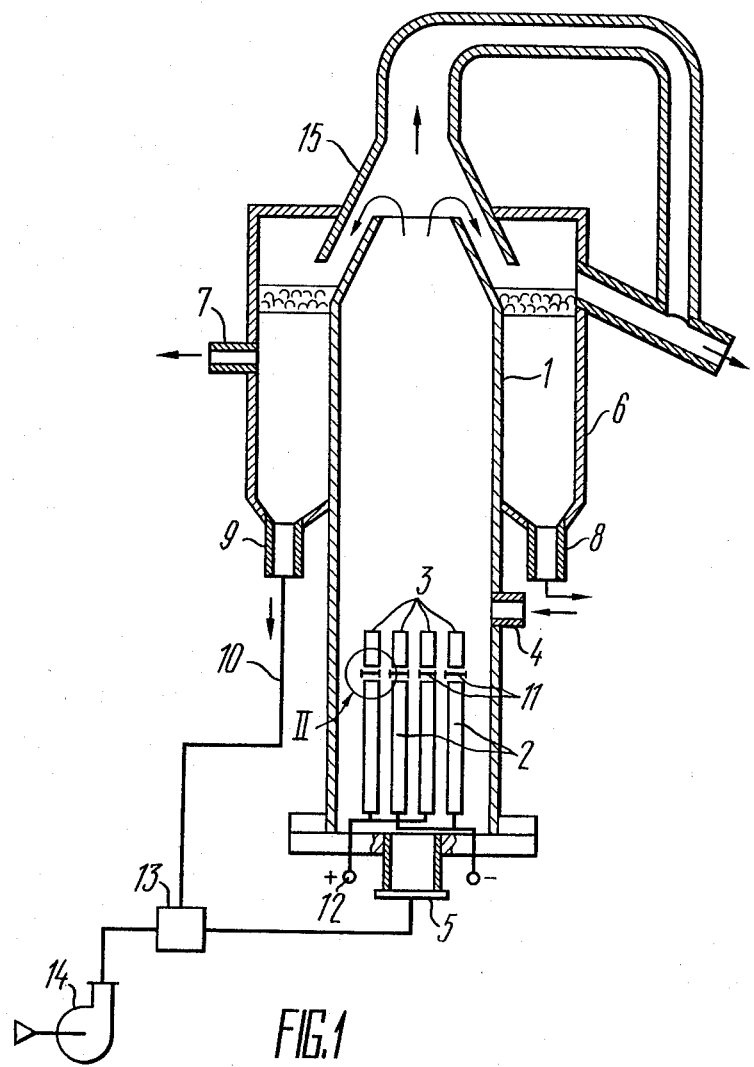
FIG. 1 is a diagrammatic sectional view of an apparatus for electrochemical purification of contaminated liquids, constructed in accordance with the present invention.
Figure 2:
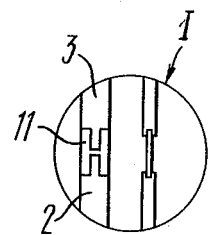
FIG. 2 is a fragmentary view showing the fragment II of FIG. 1.

An apparatus for electrochemical purification of contaminated liquids comprises (FIG. 1) a tubular electrocoagulation chamber 1 which has in its bottom portion a system of soluble plate electrodes 2, such as of aluminium, with partitions 3 of an insulating material and is provided with an inlet pipe 4 to feed contaminated liquid and an inlet pipe 5 to feed electrolyte. The electrocoagulation chamber 1 is installed in a settling chamber 6 having an outlet pipe 7 to discharge purified liquid, an outlet pipe 8 to discharge sludge, and an outlet pipe 9 to deliver a part of the purified liquid through a piping 10 into the electrocoagulation chamber 1. The partitions 3 are fastened to the electrodes 2 by fasteners 11. Terminals 12 serve to apply electric current to the electrodes 2. Also, shown conventionally in FIG. 1 are a mixer 13 to prepare the electrolyte, a pump 14 to feed the electrolyte to the electrocoagulation chamber 1, and a device 15 to remove foam from the apparatus. One of possible modifications of the fasteners 11 is shown in FIG. 2.

Figure 3:
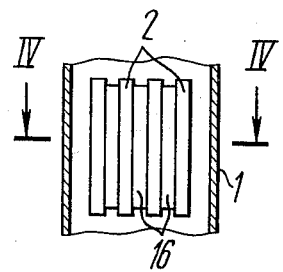
FIG. 3 shows a system of electrodes with additional partitions installed in the interelectrode gaps.
Figure 4:
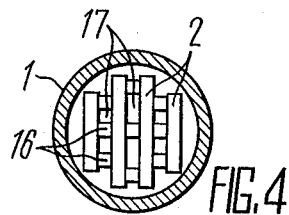
FIG. 4 is a sectional view taken along the line IV—IV in FIG. 3.

FIG. 3 shows the system of the soluble electrodes 2 with additional partitions 16 installed in the interelectrode gaps and dividing the gaps into a plurality of vertical passages 17 clearly seen in FIG. 4.

The above-described apparatus for electrochemical purification of contaminated liquids operates as follows.

Before starting the purification of a contaminated liquid, the electrocoagulation chamber 1 and the settling chamber 6 are through the inlet pipe 6 filled with electrolyte (industrial water containing a small amount of hydrochloric acid or sodium chloride. Direct electric current is applied to the terminals 12 and, flowing through the soluble electrodes 2 and the electrolyte, brings about the formation on the surfaces of the electrodes 2 of aluminium hydroxides and gas (hydrogen and oxygen) bubbles which float to the top portion of the electrocoagulation chamber 1. In 25–30 s after the application of electric current to the electrodes 2, feeding the contaminated liquid through the inlet pipe 4 into the electrocoagulation chamber 1 is started. The interaction of the contaminated liquid with the aluminium hydroxides results in coagulation of impurity particles contained in the liquid being purified, with the formation of aggregates of the particles, which then are carried up by the gas bubbles along the electrocoagulation chamber 1. The liquid thus treated enters the settling chamber 6 where it is separated into a pure liquid, foam, and sludge. The foam is removed from the apparatus by the device 15; the sludge, through the outlet pipe 8; and the purified liquid is discharged from the apparatus through the outlet pipe 7. A part of the purified liquid is by means of the pump 14 fed through the outlet pipe 9 and the piping 10 into the mixer 13 whereinto also the required amount of hydrochloric acid or sodium chloride is added to prepare the electrolyte which is then admitted through the inlet pipe 5 into the electrocoagulation chamber 1.

When purifying a liquid contained oils, greases, petroleum products, it is useful to add hydrochloric acid in the liquid in the course of its purification, as this lowers the chemical stability of impurities.

The provision of the partitions 3, 16 in the apparatus for electrochemical purification of contaminated liquids considerably retards the development of aggregates of the hydroxides of the metal (coagulants) of the soluble electrodes 2 and gas bubbles, thereby increasing the degree of their utilization and hence reducing the electric power consumption for the purification, lowering the consumption of the electrodes 2, and raising the purification efficiency of the apparatus.

For example, an apparatus comprising an 1.0-m diameter, 1.2 m high cylindrical settling chamber 6 and an electrocoagulation chamber 1 in the form of a 0.3-m diameter, 3.0 m high tube in whose bottom portion ten pairs of aluminium plate electrodes 2 were secured at a distance of 0.6 m from an inlet pipe 4, the total working area of the electrodes being of 3 m², and the distance between the anode and cathode in each pair, of 12 mm, was provided with PVC partitions 3 and 16. The partitions 3 were 0.5 m high, and their thickness and width were equal to the thickness and width of the electrodes 2. The partitions 16 were 3-4 mm thick, of a height equal to that of the electrodes 2 with the partitions 3, of 12 mm in width, and spaced at 10-cm intervals. The electrodes 2 were fed with direct electric current at a voltage of 12 V and a current density of 10 mA/cm². The apparatus was employed to purify used cutting fluid with no visible interphases, the fluid being a high-concentration waste water featuring a high stability of chemical bonds in the impurities whose overall content was of 3-5 g/l. At an electric power consumption of 2 kWh/m³ and an electrode aluminium consumption of 90 g/m³, the apparatus efficiency (purification rate) was of 6.0-7.0 m³/h. The content of impurities in the purified liquid was of 18-25 mg/l. An analysis of the sludge taken from the apparatus showed the utilization of aluminium hydroxide to be as high as 75-80% of the total consumption of aluminium.

The performance of an apparatus constructed according to USSR Inventor's Certificate No. 644,738 in purifying a similar liquid was as follows:

| | |
|---|---|
| purification rate | 5.2-6.0 m³/h; |
| electric power consumption | 2.5 kWh/m³; |
| aluminium consumption | 160 g/m³; |
| effective utilization of aluminium hydroxide | 55-60%. |

It will be understood that the present invention is not intended to be limited to the embodiments thereof, described and shown hereinabove, and that various alterations and modifications of the proposed apparatus for electrochemical purification of contaminated liquids may be made without departing from the spirit and scope of the present invention.

What is claimed is:

1. In an apparatus for continuous electrochemical purification of contaminated liquids comprising, an electrocoagulation chamber for containing an electrolyte and having upstanding soluble elongated electrodes therein, means to introduce said electrolyte into said electrocoagulation chamber and flow it between the electrodes, means to introduce contaminated liquid into said electrocoagulation chamber while it contains said electrolyte, said electrodes being disposed laterally spaced from each other and extending in parallel relationship, a plurality of solid, elongated insulative partitions disposed next adjacent to the electrodes defining jointly with the electrodes a plurality of separate liquid flow paths between the next adjacent electrodes to preclude mixing and turbulence of the electrolyte as it flows through said flow paths.

2. In an apparatus for continuous electrochemical purification of contaminated liquids according to claim 1, in which said partitions are disposed as continuations of the electrodes.

3. In an apparatus for continuous electrochemical purification of contaminated liquids comprising, an electrocoagulation chamber for containing an electrolyte and having upstanding soluble elongated electrodes therein, means to introduce said electrolyte into said electrocoagulation chamber and flow it between the electrodes, means to introduce contaminated liquid into said electrocoagulation chamber while it contains said electrolyte, said electrodes being disposed laterally spaced from each other and extending in parallel relationship, a plurality of solid, elongated insulative partitions disposed between next adjacent electrodes defining jointly with the electrodes a plurality of separate liquid flow paths between the nect adjacent electrodes to preclude mixing and turbulence of the electrolyte as it flows through said flow paths.

* * * * *